United States Patent [19]
Sugiura et al.

[11] 4,295,186
[45] Oct. 13, 1981

[54] SLIT ILLUMINATING DEVICE

[75] Inventors: Muneharu Sugiura, Tokyo; Seiji Sagara, Kawasaki, both of Japan

[73] Assignee: Canon Kabushiki Kaisha, Tokyo, Japan

[21] Appl. No.: 954,760

[22] Filed: Oct. 26, 1978

Related U.S. Application Data

[63] Continuation-in-part of Ser. No. 948,399, Oct. 4, 1978, abandoned.

[30] Foreign Application Priority Data

Oct. 12, 1977 [JP] Japan .................. 52-122172

[51] Int. Cl.³ .................. F21V 7/12; G03B 27/54
[52] U.S. Cl. .................. 362/217; 362/297; 362/301; 355/67
[58] Field of Search .................. 355/67, 69, 70, 8, 84; 362/217, 220, 222, 223, 224, 225, 297, 307, 347

[56] References Cited

U.S. PATENT DOCUMENTS

| | | | |
|---|---|---|---|
| 2,341,658 | 2/1944 | Salani | 362/297 |
| 3,001,061 | 9/1961 | Moore | 362/297 |
| 3,066,445 | 12/1962 | D'Amico | |
| 3,669,538 | 6/1972 | Fowler | 355/67 |
| 3,777,135 | 12/1973 | Rees | 362/225 |
| 3,982,116 | 9/1976 | Sakuma | 355/67 |
| 4,034,217 | 7/1977 | Dumont | |

FOREIGN PATENT DOCUMENTS 51-23725 2/1976 Japan .

Primary Examiner—L. T. Hix
Assistant Examiner—Alan Mathews
Attorney, Agent, or Firm—Fitzpatrick, Cella, Harper & Scinto

[57] ABSTRACT

A slit illuminating device having a plurality of linear surface mirrors, each partially surrounding a light source, whereby the illumination and the distribution of illumination at the slit section can be maintained uniform and stable, even when changes occur in the position of the light source.

3 Claims, 10 Drawing Figures

SLIT ILLUMINATING DEVICE

This is a continuation-in-part of application Ser. No. 948,399, filed Oct. 4, 1978, now abandoned.

BACKGROUND OF THE INVENTION

1. Field of the Invention

This invention relates to a slit illuminating device capable of performing uniform illumination of light at a slit section irrespective of the position of a light source.

2. Description of the Prior Art

There have so far been used generally reflecting mirrors having a quadratic surface such as ellipsoidal, parabolic, and hyperbolic mirrors when viewed in cross-section, or a simple linear surfaced mirror as the reflecting mirror for the slit illuminating device. For the linear surfaced reflecting mirror, there can be enumerated such one as shown in FIG. 1 of this application, and one that consists of a plurality of linear surfaced mirrors as shown in U.S. Pat. No. 3,777,135. In U.S. Pat. No. 3,777,135, divergent light from a light source is reflected by each reflecting mirror, and this reflected light is used as the divergent light for overall irradiation of an image original. Each of the linear surfaced mirrors takes such a position that its light path length may continuously decrease or increase relative to one end of the image original to the other end thereof. However, it does not, at least, take a structure of the quadratic surface having light converging property such as an ellipsoid. This constitutes a point of difference between the slit-exposure and the overall exposure. In other words, while the former is light-converging, the latter is light-diverging. This difference becomes evident in the presence or absence of the light converging property, when compared with a reflection factor of a conventional multi-surfaced mirror aimed at easiness in its manufacture.

In the case of the linear surfaced mirror as shown in FIG. 1, there is such a disadvantage that overall loss in the quantity is great, since light beam from a light source is diverged, although relatively stable distribution of illumination can be obtained at the slit section, even when a light source position substantially deviates from that where it should primarily be.

Also, as shown in FIG. 2, when the reflecting mirror has the quadratic surface in its cross-section such as ellipsoidal, parabolic, and hyperbolic surfaces, there can be performed efficient light illumination once the light source is fixed at the first focus position, because the focus can be determined strictly. On the contrary, when the light source deviates from the particular position, there arises such a disadvantage that the illumination and the distribution of illumination at the slit section varies largely. In order to solve such disadvantage, laid-open Japanese Patent Application No. 51-23725 discloses a reflecting mirror, in which the quadratic surface mirror is slit into two portions, and such split reflecting mirrors are arranged with their focus positions being differentiated. Such reflecting mirror, however, is complicated in its manufacture and adjustment of the focus position, since such double focus position requires adjustment in their inter-relationship. Moreover, there still remains such a question as to whether irregularity in the illumination can be reduced or not, even when the light source position deviates in the direction perpendicular to the principal axis.

SUMMARY OF THE INVENTION

It is therefore an object of the present invention to provide a slit illuminating device capable of performing uniform and stable light illumination at the slit section, even when there occurs substantial changes in the position of the light source.

This object of the present invention can be attained by surrounding the light source which extends in parallel with the longitudinal direction of the slit section, with a multi-linear surfaced mirror, the longitudinal direction of which is in parallel with the light source. Here, the length in the short side direction of each linear surfaced mirror in the multi-surfaced mirror is determined by the fitting position of the light source, positional relationship between the slit section and the multi-surfaced mirror, and the size of the light source, and so on.

DESCRIPTION OF THE PREFERRED EMBODIMENTS

In the following, the present invention will be described in detail in reference to the accompanying drawing showing a preferred embodiment of the present invention.

Figure 1A:
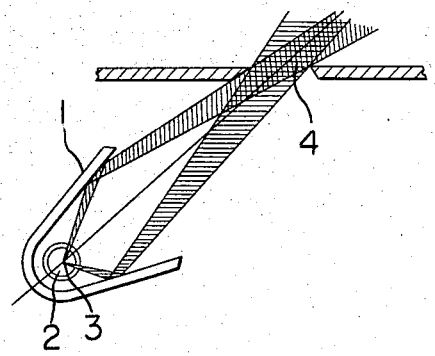
FIGS. 1A and 1B indicate cross-sectional view of a reflecting mirror using a conventional flat surface reflecting mirror.
Figure 1B:
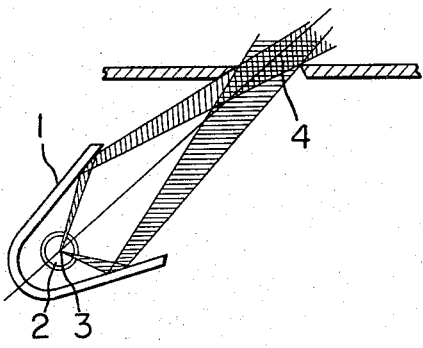

FIGS. 1A and 1B indicate an illuminating condition of the slit section by the reflecting mirror utilizing a conventional linear surface mirror. In FIG. 1A showing an illuminating light path diagram in the case the light source filament 3 of where the lamp 2 is at a position where the abovementioned reflecting mirror 1 should primarily be, the illuminating light quantity to a portion 4 to be illuminated, out of the light quantity irradiated from the filament 3, is very slight. On the other hand, as shown in FIG. 1B, the difference in the distribution of illumination and the illumination at the portion 4 to be illuminated is very small in comparison with a case of the abovementioned FIG. 1A, even when the position of the light source filament 3 of the lamp 2 is deviated from the primary position of the reflecting mirror 1. However, when the linear surface mirror is used as mentioned above, efficiency in use of light from the light source remarkably lowers.

For the other type of the conventional reflecting mirror than the abovementioned linear surface mirror to reduce loss in the light quantity, there are ellipsoidal, parabolic, hyperbolic, or other quadratic surface reflecting mirrors.

Figure 2A:
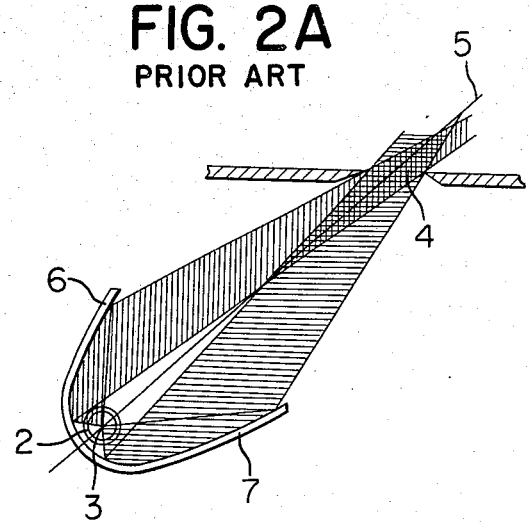
FIG. 2A shows a cross-section of a reflecting mirror using a conventional ellipsoidal reflecting mirror, wherein the position of the light source filament is at the focal point of the ellipsoid.
Figure 2B:
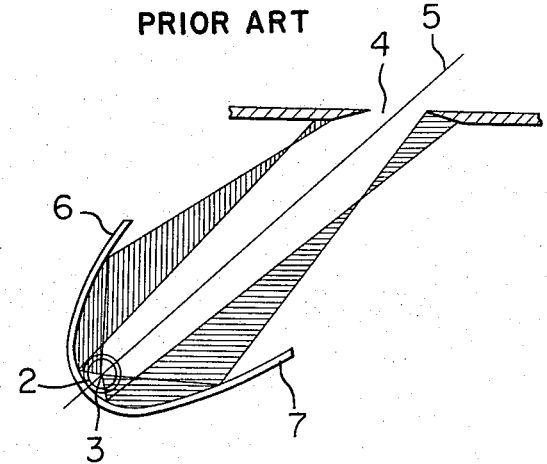
FIG. 2B also shows a cross-section of the ellipsoidal reflecting mirror in FIG. 2A, wherein the light source filament is deviated from the focal position.

FIGS. 2A and 2B illustrate an example of ellipsoidal reflecting mirrors 6 and 7 split into two portions relative to the optical axis 5. As shown in FIG. 2A, when the light source filament 3 is at a position where it should primarily be, i.e., at a focal position of each of the ellipsoidal reflecting mirrors which have been split into two relative to the optical axis 5, light emitted from the light source filament 3 can be illuminated with high efficiency onto the portion 4 to be illuminated with relatively small loss in the light quantity. However, as shown in FIG. 2B, when the position of the light source filament 3 is deviated from the position where it should primarily be, i.e., at a position away from the common focal position of the respective ellipsoidal reflecting mirrors 6 and 7 as divided into two relative to the optical axis 5 (FIG. 2B, this shows a case where the light source filament is positioned in the direction where it is away from the portion 4 to be illuminated along the optical axis 5), the light from the light source filament 3 does not sufficiently illuminate the portion 4 to be illuminated, as the result of which illumination to the portion 4 to be illuminated at a position where the light source filament should primarily be, and the distribution of illumination as well as the illumination at the portion 4 to be illuminated vary remarkably.

Figure 3:
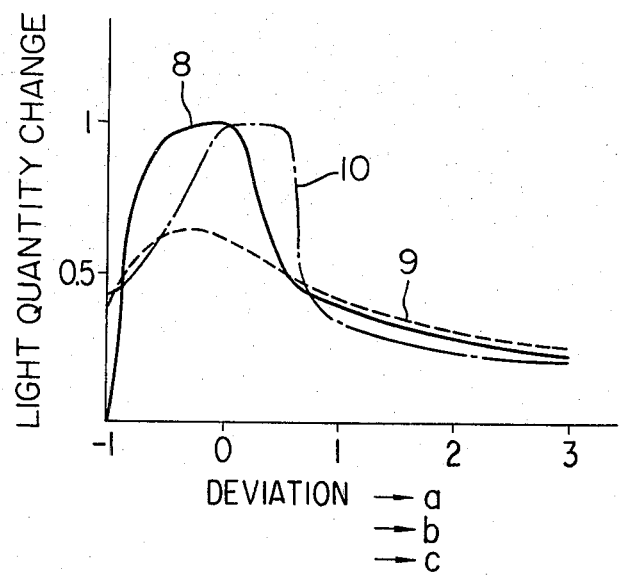
FIG. 3 is a graphical representation showing variations in the light quantity at a portion to be illuminated when the light source filament in the abovementioned ellipsoidal reflecting mirror deviates from its focus.
Figure 4:
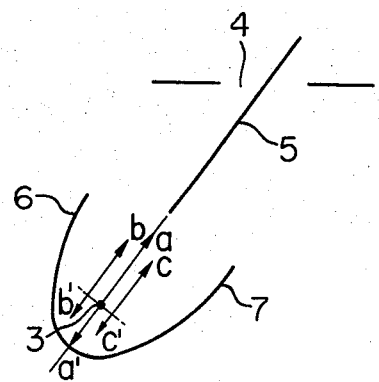
FIG. 4 is an explanatory view showing a moving direction of the light source.

FIG. 3 is a graphical representation showing variations in light quantity at the portion 4 to be illuminated, when the light source filament in the ellipsoidal reflecting mirror in FIG. 2A deviates from a position where the light source filament should primarily be. In this graphical representation, a solid line 8 shows a quantity of deviation of the light source filament 3 on the optical axis 5 to be shown in FIG. 4. A position O indicates a place where the light source filament 3 should primarily be, and positive symbols indicate a direction a, along which the filament 3 approaches the portion 4 to be illuminated (vide: FIG. 4). A dash line 9 in FIG. 3 indicates variations in the light quantity at the abovementioned portion 4 to be illuminated, when the light source filament upwardly deviates by 1 mm in the direction perpendicular to the optical axis 5, and varies in parallel with the optical axis (b-b' in FIG. 4). Also, a dot-and-dash line 10 in FIG. 3 shows variations in the illuminating light quantity at the portion 4 to be illuminated, when the light source filament deviates opposite to the case of the abovementioned dash line by 1 mm in the direction perpendicular to the optical axis 5, and varies in parallel with the optical axis 5 (c-c' in FIG. 4). Incidentally, a negative symbol in FIG. 3 denotes that the light source filament 3 is away from the portion 4 to be illuminated, and symbols a', b' and c' indicate its direction and variation.

As will be apparent from FIGS. 2 and 3, the deviation of the light source filament from the focal position of the ellipsoidal reflecting mirror brings about substantial changes in the light quantity at the light source section, whereby the distribution of illumination at the portion 4 to be illuminated largely varies to influence the setting conditions of the image formation. The same thing can be said of a reflecting mirror of a quadratic surface other than the ellipsoid.

Figure 5:
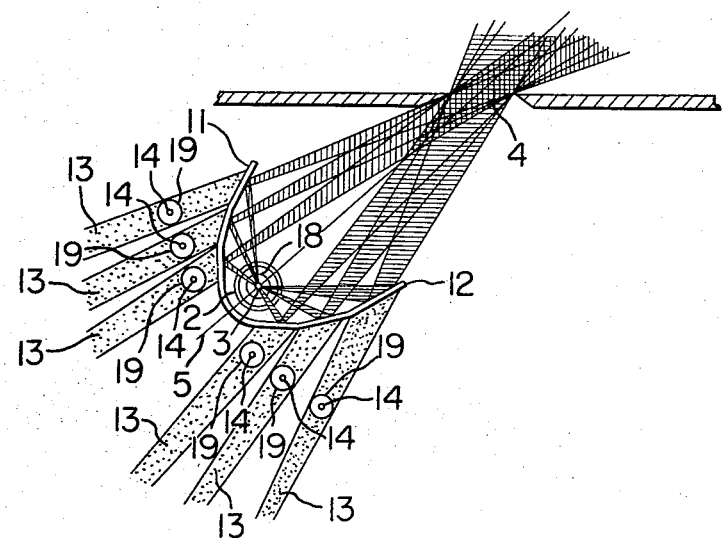
FIG. 5 is a cross-sectional view of a multi-linear surface reflecting mirror according to the present invention.

FIG. 5 shows one embodiment of the present invention in its cross-section. The reflecting mirrors 11 and 12 in FIG. 5 serve to solve the problem of shortage in the light quantity of the linear surface mirror and the problem of variations in the distribution of illumination due to positional errors by the ellipsoidal reflecting mirror. The reflecting mirror 11 is positioned near the slit section, while the reflecting mirror 12 is positioned away from the slit section. The entire reflected light from the mirrors 11 and 12 effectively irradiates the slit section. As shown in FIG. 5, the reflecting mirrors 11 and 12 having a configuration as split into two by the optical axis 5 and having different eccentricity in the case of, for example, an ellipsoidal reflecting mirror, are composed of a plurality of continuous linear surfaced reflecting mirrors. Each of the linear surfaced reflecting mirrors is disposed at a position, in a size and direction to reflect light from the light source filament to the portion 4 to be illuminated. Accordingly, those light beams from the light source filament 3, corresponding in number to the linear surfaces which the reflecting mirrors 11 and 12 possess, illuminate the portion 4 to be illuminated, whereby sufficient light quantity can be obtained at this portion 4. A reference numeral 19 designates a virtual image due to the multi-surfaced mirror within the permissible range 18 of the light source filament 3. By connecting the virtual image 19 and the slit section 4, the position, size and direction of each of the linear surfaced mirrors constituting the multi-surfaced reflecting mirror can be determined. Dotted regions 13 are the extension from each of the linear surfaced mirror and the slit section as connected. A reference numeral 14 designates a virtual image of the light source filament 3 to be formed by the multi-surfaced mirror whem the filament 3 is at the ideal position.

Figure 6:
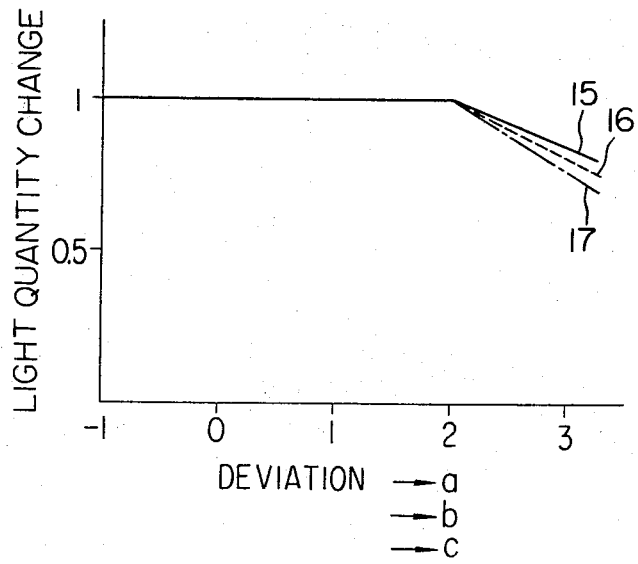
FIG. 6 is a graphical representation showing variations in the light quantity due to positional deviation of the light source filament in the multi-linear surface reflecting mirror.

FIG. 6 is a graphical representation showing the distribution of illumination when the light source filament is deviated from a position where it should primarily be. In the graphical representation, a solid line 15 denotes a distribution of illumination due to movement of the light source filament on the optical axis, and a dash line 16 denotes a distribution of illumination when the light source filament is deviated by 1 mm in the same direction b-b' as in the case of changing the direction of the light source filament shown in FIG. 4, and then moved in parallel with the optical axis 5. A dot-and-dash line 17 denotes a distribution of illumination when the light source filament is deviated by 1 mm in the same direction as the direction c-c' in FIG. 4, and then moved in parallel with the optical axis. Accordingly, the reflecting mirror in the present invention can illuminate the portion 4 to be illuminated with a sufficient light quantity, and perform stable illumination free from fluctuation in the distribution of illumination at the portion 4 to be illuminated, even when the light source filament is deviated more or less from the position where it should primarily be, i.e., if it is within a permissible range 18.

Figure 7A:
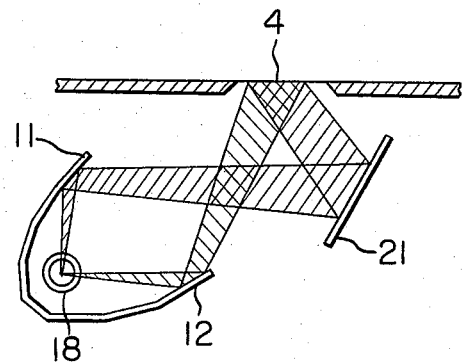
FIG. 7A is a cross-sectional view of an arrangement of another embodiment according to the present invention.
Figure 7B:
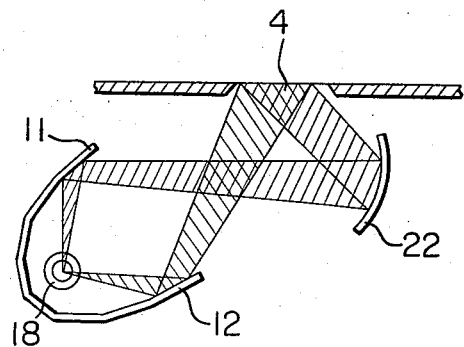
FIG. 7B is a cross-sectional view of an arrangement of further embodiment according to the present invention.

FIGS. 7A and 7B show other embodiment. In each of the arrangements shown in these Figures, the mirror 11 is more inclined in the clockwise direction with respect to the lamp 2 than in the foregoing embodiment, so that the light reflected by the mirror is substantially parallel with the slit portion 4. The light is then reflected by the third mirror, a plane mirror 21 (FIG. 7A) or a mirror having a quadratic surface (FIG. 7B) to illuminate the slit portion 4, while the light reflected by the mirror 12 directly illuminates the slit portion 4. It will be understood from FIGS. 7A and 7B that the light from the mirror 11 and the light from the mirror 12 are incident to the slit portion 4 substantially symmetrically. Except for those described above in this paragraph, the arrangement is the same as of the embodiment described hereinbefore.

The reflecting mirror according to the present invention is only for slit illumination. However, it is also applicable to a case where an image original placing or support table is fixed and the light source and the reflecting mirror move, and to a case where the image original placing table moves and the light source and the reflecting mirror are fixed.

As stated in the foregoing, the present invention aims at removing irregularity in illumination due to errors in its manufacture and fitting so as to constantly obtain stable illumination. For this purpose, the quadratic surface mirror of good illuminating efficiency is used in an illuminating device having a plurality of linear surfaced mirrors, each being relatively close to the quadratic surface.

What we claim is:

1. A slit illuminating device for an image reproduction apparatus, which comprises:
   (a) an original support table having a slit portion for slit illumination of an original;
   (b) a tubular shaped light source arranged with its longitudinal axis spaced a predetermined distance from and parallel to a reference line which extends along the length of said slit; and
   (c) a multi-surfaced mirror partially surrounding said light source and comprising a plurality of planar mirrors provided on both sides of a plane defined by the longitudinal axis of said light source and the reference line, wherein the respective length of each planar mirror, when viewed in cross-section defined by a plane perpendicular to the reference line, is such that it transmits an effective bundle of light, as if emitted from a corresponding enlarged virtual image of said light source, to said slit portion, the size of the enlarged image being determined in accordance with an acceptable deviation of said light source from a predetermined mounting position.

2. A slit illuminating device for an image reproduction apparatus, which comprises:
   (a) an original support table having a slit portion for slit illumination of an original;
   (b) a tubular shaped light source arranged with its longitudinal axis spaced a predetermined distance from and parallel to a reference line which extends along the length of said slit;
   (c) a first multi-surfaced mirror comprising a plurality of planar mirrors located above a plane defined by the longitudinal axis of said light source and the reference line of said slit portion, wherein the respective length of each planar mirror, when viewed in cross-section defined by a plane perpendicular to the reference line, is such that it transmits an effective bundle of light, as if emitted from a corresponding enlarged virtual image of said light source, in a direction substantially parallel to the support table;
   (d) a second multi-surfaced mirror comprising a plurality of planar mirrors located below said plane defined by the longitudinal axis and reference line, wherein the respective length of each said planar mirrors when viewed in cross-section defined by a plane perpendicular to the reference line, is such that it transmits an effective bundle of light, as if emitted from a corresponding enlarged virtual image of said light source, to said slit portion; and
   (e) a third mirror for receiving the light reflected by said first multi-surfaced mirror and directing that light to incident the slit section so as to substantially completely overlap the light incident thereon from the second multi-surfaced mirror;
   wherein the size of the enlarged images for the respective planar mirrors of said first and second multi-surfaced mirrors is determined in accordance with an acceptable deviation of said light source from a predetermined mounting position.

3. A device according to claim 1 or 2, wherein said planar mirrors are arranged along a quadratic surface.

* * * * *